United States Patent [19]
Van Dyke

[11] 3,715,093
[45] Feb. 6, 1973

[54] AUTO-ADVANCE THROTTLE CONTROL

[75] Inventor: Roscoe H. Van Dyke, Santa Ana, Calif.

[73] Assignee: McDonnell Douglas Corporation

[22] Filed: Dec. 27, 1971

[21] Appl. No.: 212,443

[52] U.S. Cl. ............... 244/76 B, 60/39.15, 60/102
[51] Int. Cl. ............................................. B64c 13/16
[58] Field of Search ....... 244/76, 77 R, 83 R; 60/233, 60/235, 237, 238, 239, 243, 39.28, 39.15, 97, 102; 415/61

[56] References Cited

UNITED STATES PATENTS

| | | | |
|---|---|---|---|
| 1,978,863 | 10/1934 | Gregg et al. | 244/76 B |
| 2,645,240 | 7/1953 | Drake | 244/76 B |
| 3,306,048 | 2/1967 | Ellis | 60/243 |
| 3,310,949 | 3/1967 | Pallis et al. | 60/243 |

Primary Examiner—Trygve M. Blix
Assistant Examiner—Jesus D. Sotelo
Attorney—Walter J. Jason et al.

[57] ABSTRACT

A system compensating for sudden and unexpected loss of thrust resulting from engine failure in a short takeoff and landing (STOL) aircraft in a high angle of attack attitude, such as in the landing mode, by advancing the throttle of an adjacent engine on the same side of the longitudinal centerline of the aircraft as the faulty engine. An overcenter actuating mechanism combines amplification of a small signal source with rapid rate of response. The small signal force results from comparison of adjacent engine selected parameters.

7 Claims, 2 Drawing Figures

PATENTED FEB 6 1973
3,715,093
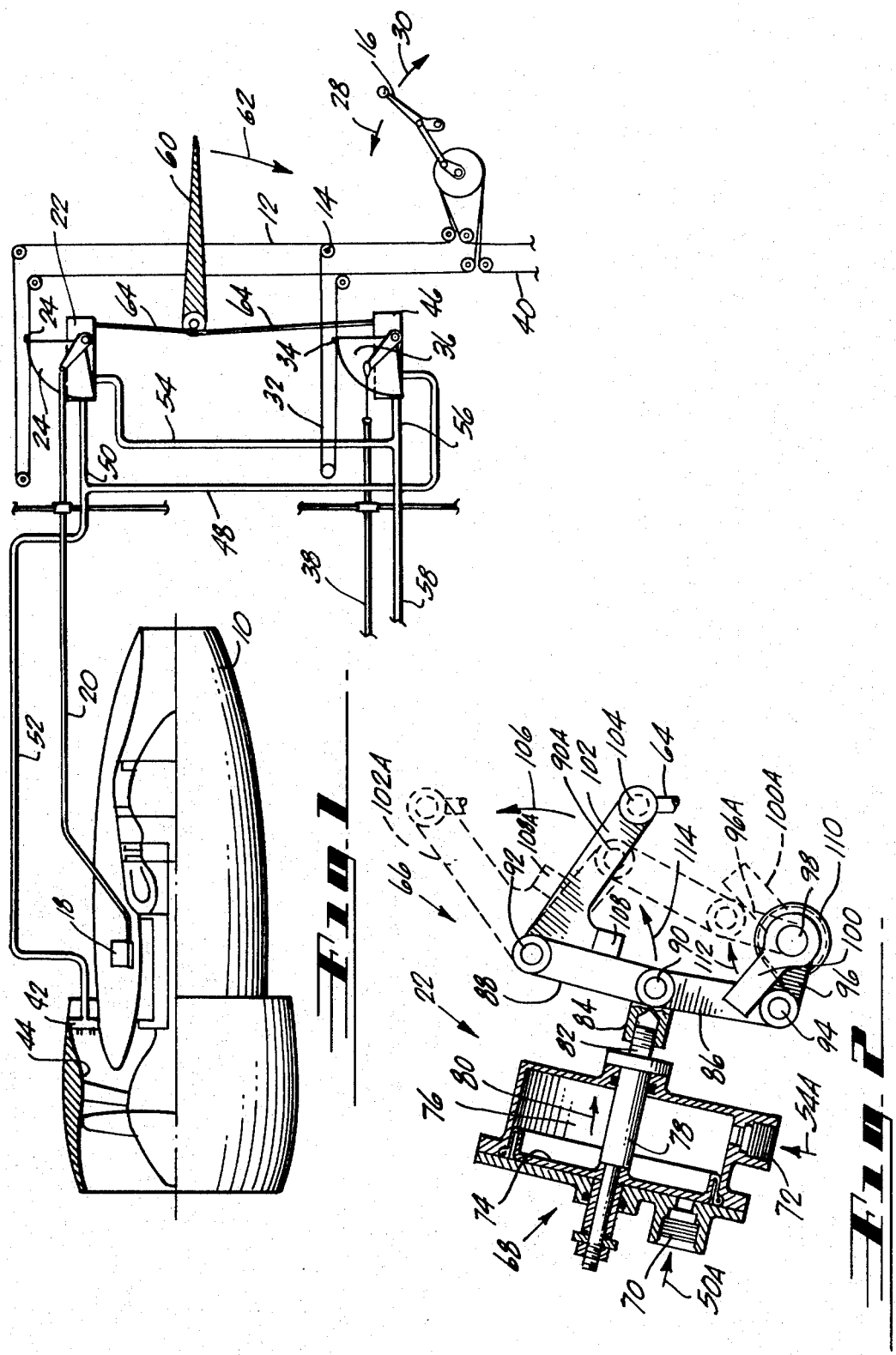

AUTO-ADVANCE THROTTLE CONTROL

BACKGROUND OF THE PRESENT INVENTION

The concept of automatic engine thrust control is not new. Commercial aircraft, in some cases, are provided with auto-thrust control systems which operate in conjunction with the autopilot. Auto-thrust control provisions are also included in military aircraft for use during a carrier landing approach, for example. There is a system for a VTOL engine control system that senses the thrust of the engines on both sides of the longitudinal centerline of the aircraft by means of a pivoted spring loaded exhaust flow flap, and when the thrust of any engine falls below a predetermined value, an engine on the opposite side of the aircraft's centerline is shut down and the remaining engines are supplied with additional fuel to increase their thrust. There is another system for automatically maintaining a group of engines at a predetermined thrust level by sensing fluid pressure from all of the engines with a pressure responsive device. This device is coupled to all engine throttles and advances the throttles on the remaining engines when any engine malfunctions. Manual throttle control is also provided. All such previously known systems tend to be complex and require a considerable number of sensing and actuating mechanisms, all of which must be relied upon to permit satisfactory operation of the system.

SUMMARY OF THE PRESENT INVENTION

The system presented herein is intended for use on a short takeoff and landing (STOL) aircraft with four or more engines which are used as or in conjunction with other mechanisms as lift augmentation devices. For this type of aircraft a particularly critical flight condition is encountered during landing approach when the aircraft must rely upon thrust-augmented lift to maintain its approach path and flight stability. Because of the glide slope or descent requirements, the aircraft will normally approach with the engines at some reduced power setting. Failure of one engine during this condition requires an immediate thrust compensating response to prevent serious aerodynamic stability problems.

The automatic advance throttle control system of the present invention provides a means of rapidly compensating for a sudden unexpected loss in thrust due to an engine failure. It also provides a means of warning the pilot of this occurrence. The system may be added to a conventional mechanical throttle control system with a minimum of rework and at low cost.

Thrust compensation is accomplished by:

1. Continuously sensing a parameter or parameters of the engine indicative of the engine thrust level,
2. Comparing this parameter (or parameters) with that of an adjacent engine (or engines) which acts in concert with the aforementioned engine to provide lift augmentation for the same area of the aircraft (a single composite lift force vector),
3. Automatically compensating for loss of thrust of an engine (as indicated by abnormal differential between the sensed parameters) by advancing the throttle of the adjacent engine, which also advances the throttle lever of that engine in the cockpit, thereby providing a warning to the pilot of the engine failure.

A feature of this invention is the ability to disarm the auto-throttle during conventional aircraft flight modes. This may be accomplished automatically as shown by retraction of the lift flap or by other means such as, but not limited to, stowing or tilting of the engines, as is provided for the direct lift engine STOL aircraft, or this may be accomplished manually by a control mounted in the cockpit.

This invention has a discrete actuation or trigger point for response which may be the overcoming of the overcenter mechanism opposing force or by other means of operating the pilot actuator such as, but not limited to, an electrical system which triggers a solenoid type of pilot actuator. This overcenter actuating mechanism combines the features of amplification of a small signal force with a rapid rate of response. Easy adjustment may be made to satisfy many signal strength variations and the triggering point desired. Another feature of this invention is the capability of the pilot to manually override the actuator after it has advanced the throttle, either by direct force applied to the throttle lever or in the case of a landing abort, by re-engaging the latch either manually or by conversion of the aircraft to the conventional flight mode. In the latter case the actuating mechanism can be relatched without disturbing the throttle position, i.e., the engine thrust level.

BRIEF DESCRIPTION OF THE DRAWINGS

FIG. 1 is a schematic illustration showing the operation of the control system, and FIG. 2 is a partial sectional view of the sensor device and linkage structure of the auto-throttle actuator.

DETAILED DESCRIPTION OF ILLUSTRATIVE EMBODIMENTS

A typical example of the application of this invention is for a four-engine STOL aircraft with fixed engines mounted on the wing and paired such that two engines on each side act in concert to produce a common lift force vector. A typical turbo-fan engine 10 is shown with a conventional mechanical throttle control system consisting of a push-pull throttle control cable 12, pulleys 14, and throttle control levers 16.

Each engine 10 has an engine fuel control 18 connected by the push-pull cable 20 to an auto-throttle actuator 22 having a throttle segment 24 connected at point 26 to the cable 12 which in turn may be moved by the pilot through throttle control lever 16. Thus, movement of the throttle control lever 16 in the direction of arrow 28 will cause rotation of the throttle segment 24 on the auto-throttle actuator 22 to move the throttle control cable 20 which in turn actuates the engine fuel control 18 to add more fuel for engine consumption and thus increase the thrust. Conversely, the rotation of the throttle control lever 16 in the direction of arrow 30 would reduce the fuel consumption and thus reduce the thrust from that particular engine. Conventionally, there is a separate throttle control lever for each engine on the aircraft, although mechanisms are provided whereby they may all work together for a uniform control of thrust in all engines or they may be separately operable by the pilot for any adjustment he may care to make. Cables 32 in FIG. 1 control movement of a second engine, not shown, through its pivotal connection 34 with a second auto-throttle actuator 36 whereby a second pushrod 38 actuates a second engine fuel control, not shown. Although, as shown in the drawing, cable 12 and cable 32, as well as a third set of cables 40, all appear to be actuated by a single throttle control lever 16, it is to be understood that this showing is for simplicity purposes, only, since for purposes of this invention, it is sufficient that each auto-throttle actuator may be independently controlled by the pilot in pilot override mode.

The engine parameter sensed in this case is fan total discharge pressure although this invention shall not be limited to the sensing of this parameter alone. Other parameters this invention might use, but not be limited to, are fan rpm, gas generator compressor discharge pressure, engine fuel pump pressure and turbine exhaust gas temperature. The parameter signals from the two adjacent engines are compared in two auto-throttle actuators which are installed, one in each engine throttle control system.

The fan total discharge pressure of each engine can be sensed by a plurality of pitot tubes 42 installed in each of the engine cowls 44. The pressure from engine 10 will be compared with its adjacent engine, not shown, in each of the two auto-throttle actuators 22 and 46. Pressure lines 48, 50 are connected to actuators 46 and 22, respectively, and also connect with line 52 leading from the pitot tube sensors 42. Pressure lines 54 and 56 also are connected to the auto-throttle actuators 22 and 46 and interconnect the pitot tubes from the second engine, not shown, through pressure line 58. Thus, each auto-throttle actuator continuously compares the fan exit total pressures of the two adjacent engines via the pitot tubes installed in the engine cowls, in the examples set forth in FIG. 1. Details of the auto-throttle actuator for accomplishing this will be more fully described and set forth hereinafter. Because the auto-throttle actuator system of the present invention is intended to be used only in the landing mode of the aircraft, it may be armed and operable only when the flaps 60 are moved down in the direction of arrow 62. This movement actuates a latch control system 64 connected to the actuators 22 and 46 and permit them to operate in accordance with the differential pressures sensed or other parameters selected.

Reference is now made to FIG. 2 wherein the structure of the auto-throttle actuator and its function is more fully and clearly set forth. The auto-throttle actuator 22 consists of a linkage structure 66 which, when actuated, will increase the throttle setting to full power for the engine adjacent the engine failing in performance. The determination as to which engine is faulty is the function of the sensor device 68. This sensor continuously compares the fan exit total pressure from engine No. 1 at inlet 70, represented by arrow 50A, with the fan exit total pressure from the adjacent engine No. 2 at inlet 72, represented by arrow 54A. These pressures are exerted on opposite sides of a piston head 74 that normally is maintained in the position shown. When the second engine fails the pressure in the inlet 72 decreases and the higher differential pressure from inlet 70 drives the piston head 74 into the cavity 76. (A higher differential pressure at inlet 72 appears via tube 48 to the other inlet in companion actuator 46 in FIG. 1 indicating failure of engine No. 1 instead of engine No. 2). This piston movement drives the shaft 78 in the direction of arrow 80, driving the actuator or plunger 82 with its adjustment nut 84 against the linkage structure 66 as the actuating force.

The linkage structure 66 consists of two overcenter links 86 and 88 pivotally connected together at pivot point 90. The other end of link 88 is pivotally connected at a fixed pivot point 92 on the aircraft. The other end of link 86 is pivotally connected to an actuator driver arm 96. The other end of arm 96 is rotatably mounted and pivots independently on the throttle segment shaft 98. The throttle segment shaft 98 may be rotated either by the throttle segment 24 shown in FIG. 1, (that is by cable to the pilot control lever 16) or by driver arm 100 which is fixedly mounted to rotate the throttle segment shaft 98. (This actuates pilot lever 16 to notify the pilot of an engine problem). It should be noted that pivot point 90 is shown to be slightly to the left of a line between pivot points 92 and 94 and bears against the adjusting nut 84. The links 86 and 88 are maintained in this position by a latch arm 102 which is pivotally connected at pivot 92 and at its other end 104 to the latch control system 64 which, in turn, is actuated by downward movement of flap 60. This downward movement of flap 60 causes upward movement of latch arm 102 in the direction of arrow 106 to its dashed line position 102A. Stop member 108 which bore against link 88 is now out of the way and assumes its dashed line position 108A. The linkage structure 66 is now capable of actuation when driven by the plunger 82 of the sensor 68. When this occurs the links 86 and 88 move overcenter to the right. A torsion spring 110 rotates the actuator driver arm 96 in a clockwise direction as shown by arrow 112 to its dotted line position 96A. Pivot point 90 follows arrow 114 to its dotted line position 90A. The rotation of pivot point 94 through an appropriate projection causes clockwise rotation of the driver arm 100 to its dotted line position 100A causing rotation of throttle segment shaft 98 to its maximum power position. In this manner the failure of one engine will automatically cause the adjacent engine to generate maximum power thrust to compensate for the loss of thrust with such engine failure.

This invention is not limited by the geometry of the various parts as shown in the figure but by the principle modes of operation except that the sensor 68 may be a pneumatic actuator (as shown), a hydraulic actuator, a solenoid, or any type of actuator which imparts a force to the overcenter linkage as shown in principle in FIG. 2.

Having thus described an illustrative embodiment of the present invention, it is to be understood that modifications thereof will become apparent to those skilled in the art and it is to be understood that these deviations are to be construed as part of the present invention.

I claim:

1. An auto-advance throttle control to increase the thrust of one of a pair of engines on the same side of the longitudinal centerline of an aircraft when the other of said pair has a sudden and unexpected loss in thrust and said aircraft is in a high angle of attack mode, said control comprising:

sensor device means continuously sensing an engine parameter indicative of engine thrust level, comparing said parameter with that of an adjacent engine providing lift augmentation for the same area of the aircraft, responsive means responsive to an abnormal differential between the sensed parameters of said engines to compensate for loss of thrust of one of said engines by advancing the throttle of an adjacent engine, said sensor device means including an actuator operable to initiate said responsive means, said responsive means including overcenter linkage having an overcenter position and an actuating position, said actuator being operable to move said linkage to said actuating position, and connection means operable by said linkage in said actuating position to increase thrust of said one of a pair of engines.

2. An auto-advance throttle control as in claim 1 wherein said responsive means operates only when flaps on said aircraft are in their landing mode.

3. An auto-advance throttle control as in claim 2 wherein latching means maintains said overcenter linkage in overcenter position until said flaps are lowered.

4. An auto-advance throttle control as in claim 1 wherein said connection means also causes movement of the pilot's throttle control lever to indicate an engine problem to the pilot.

5. An auto-advance throttle control as in claim 1 wherein said actuator is a plunger operable to move said linkage from its overcenter position.

6. An auto-advance throttle control as in claim 1 wherein said connection means includes an actuator driver arm pivotally mounted and pivotally connected to one end of said overcenter linkage, and bias means for rotating said driver arm when said overcenter linkage has been moved to said actuating position.

7. An auto-advance throttle control as in claim 6 wherein said connection means also includes a rotatable driven arm which, when rotated, will increase engine thrust, said driver arm upon rotation causing rotation of said driven arm.

* * * * *